Patented July 31, 1951

2,562,547

UNITED STATES PATENT OFFICE 2,562,547

FLUORINATED COMPOUNDS

William E. Hanford, Easton, Pa., and Robert M. Joyce, Jr., Wilmington, Del., assignors to E. I. du Pont de Nemours & Company, Wilmington, Del., a corporation of Delaware No Drawing. Application December 11, 1944, Serial No. 567,778

8 Claims. (Cl. 260—648)

This invention relates to the preparation of fluorinated organic compounds and to new organic fluorine compounds. More particularly, the invention comprises a new process for the preparation of polyfluoro organic compounds and includes new chemical products consisting of saturated organic compounds containing one or more tetrafluoroethylene groups per molecule.

Much work has been directed toward developing a good method for preparing highly fluorinated organic compounds. It has previously been proposed to produce organic fluorine compounds by the reaction of fluorine with various organic materials. Prior investigations have shown that this reaction of fluorine is extremely energetic and generally causes pyrolysis of the organic material, resulting in the formation of carbon, tar or other undesirable carbonaceous decomposition products.

Heretofore, the only practical method for preparing fluorine containing organic compounds has been to replace chlorine or bromine with fluorine by means of various inorganic reagents, such as hydrogen fluoride, silver fluoride, antimony fluorides, mercuric fluoride and other metallic fluorides. However, such processes involve considerable expense and are very restricted in application.

It is an object of this invention to provide a new process for the preparation of saturated organic polyfluoro compounds. Another object of this invention is to obtain new compositions of matter consisting of fluorinated organic compounds. Still another object is to prepare fluoro organic compounds which have extreme stability and inertness. Still another object is to prepare polyfluoro organic compounds of extreme stability and inertness containing a plurality of —$CF_2CF_2$— units. A still further object is to provide a relatively simple and inexpensive process for readily preparing said saturated organic compounds. A still further object is to obtain saturated organic fluorinated compounds possessing many novel and useful properties. Other objects will appear hereinafter.

These objects are accomplished by heating tetrafluoroethylene, at a temperature between 75°–350° C. in the presence of oxygen or a peroxy catalyst, with an organic compound free from non-aromatic unsaturation and containing at least one aliphatic, including cycloaliphatic, carbon atom attached to three atoms other than fluorine.

A preferred form of the invention may be carried out by heating tetrafluoroethylene with a halogenated hydrocarbon which is free from non-aromatic unsaturation and which contains at least one aliphatic, including cycloaliphatic, carbon atom attached to three atoms other than fluorine, preferably in a closed system and in the presence of a peroxy catalyst. There are thus obtained saturated organic polyfluoro compounds containing a plurality of tetrafluoroethylene units per molecule of halogenated hydrocarbon.

By the expression "organic compound free from non-aromatic unsaturation," as used herein and in the appended claims, is meant an organic compound which is free from carbon to carbon multiple bonds, i. e., a double or triple bond linking two adjacent carbon atoms, other than those which are present in those in an aromatic ring, e. g., benzene nucleus.

The method for carrying out the reactions varies to some extent with different types of organic compound, but the usual procedure comprises placing the reactants in a stainless steel or silver-lined high pressure reaction vessel and then closing and heating to the desired reaction temperature while mechanically agitating the reaction vessel for several hours.

In order to prepare the products of this invention, it is usually desirable to carry out the reaction under pressure at elevated temperatures. The temperature at which the reaction is effected may be varied over a wide range, depending largely upon the nature of the reactants, the catalyst, the results desired and other conditions of the reaction. However, the temperature should be below that at which decomposition or pyrolysis of either the reactants or products occurs. No appreciable reaction is obtained below 75° C. and it is usually necessary to heat the reaction mixture to about 100° C. or higher in order to obtain a substantial reaction in a reasonable time. Highest yields are obtained most readily when the temperature range is 100° C. to 250° C. but temperatures as high as 350° C. are sometimes desirable.

A series of products can be obtained which vary from liquids to solids depending upon the number of —$CF_2CF_2$— units per molecule. The products are highly fluorinated saturated organic compounds which vary from liquids which are compatible with the common organic solvents to solids which have limited solubility or are insoluble in most solvents.

The invention is further illustrated by the following examples in which the parts are by weight unless otherwise specified.

Example I

Three hundred parts of freshly distilled carbon tetrachloride were charged into a stainless steel reaction vessel with 2 parts of benzoyl peroxide. The vessel was pressured with tetrafluoroethylene to 150 lbs./sq. in. and the reaction mixture was heated to 110° C. and the tetrafluoroethylene pressure was maintained at 150 lbs./sq. in. by repressuring from a large supply cylinder. A total pressure drop of 245 lbs./sq. in. was obtained in one hour. The reaction mixture was steam distilled to remove carbon tetrachloride and steam-volatile products. A yield of 1.1 parts of low melting solid was obtained by distilling off the carbon tetrachloride through a fractionating column. Thirty-seven parts of nonsteam-volatile solid remained in the steam distillation flask, and 10.6 parts of this solid was soluble in chloroform. Separation and analysis of the various fractions for fluorine and chlorine indicated the products consisted of a series of products containing from about 5 to about 25 units of tetrafluoroethylene per unit of carbon tetrachloride.

The same results were obtained by repeating the experiment in a silver-lined reaction vessel and also by using a basic catalyst such as sodium methylate.

Example II

Two hundred and twenty-three parts of chloroform and 1.5 parts of benzoyl peroxide were charged into a silver-lined reaction vessel and then the autoclave was pressured to 350 lbs./sq. in. with tetrafluoroethylene. The reaction was run at 110° C. similar to Example I. A small amount of steam-volatile product and 14.5 parts of nonsteam-volatile solid were obtained. All the products contained chlorine and fluorine.

Example III

On reacting 200 parts of methylene chloride containing 2 parts of benzoyl peroxide with tetrafluoroethylene at 110° C. under 350 lbs./sq. in. pressure as described in Example II, a small amount of steam-volatile product (M. P. about 75°–80° C.) and 5.5 parts of nonsteam-volatile products (M. P. about 230° C.) were obtained. The products all contained chlorine and fluorine.

Example IV

A silver-lined high pressure reaction vessel was charged with 1.5 parts of diethyl peroxide. The vessel was cooled and evacuated and 150 parts of methyl chloride and 50 parts of tetrafluoroethylene were added. The reaction was run under pressure at 140° C. for 8.25 hours. There was obtained 39 parts of a colorless solid which contained chlorine and fluorine.

Example V

Two hundred and twenty-five parts of symmetrical tetrachloroethane and 1.5 parts of benzoyl peroxide were charged into a stainless steel autoclave. The autoclave was evacuated and then 50 parts of tetrafluoroethylene were added. The autoclave was closed and run as a bomb for 9 hours at 110° C. There was obtained 21.8 parts of nonsteam-volatile solid (M. P. about 286° C.). All of the products contained chlorine and fluorine.

Example VI

One hundred and sixty-one parts of trichlorotetrafluoropropane and 0.8 part of diethyl peroxide were charged into an autoclave. The autoclave was cooled and evacuated and 50 parts of tetrafluoroethylene added. The reaction was run under pressure for 6.5 hours at 150° C. There was obtained 25.4 parts of nonsteam-volatile solid which contained chlorine and fluorine.

Example VII

One hundred and seventy-six parts of 2-methyl-2-chloromethyl dioxolane-1,3 and 1.5 parts of benzoyl peroxide were added to a stainless steel autoclave and after evacuating, the autoclave was pressured to 350 lbs./sq. in. with tetrafluoroethylene and heated to 110° C. for 9.2 hours. The reaction mixture was steam distilled to yield 20 parts of steam-volatile liquid products, a small amount of steam-volatile solid and 3 parts of nonsteam-volatile waxy solid (M. P. about 130° C.). On fractional distillation of the liquid products the percentage of fluorine was found to increase and the percentage of chlorine to decrease with increase in boiling point.

| Boiling Point, °C. | Analysis | | Calculated | | Ratio $C_2F_4/C_3H_5ClO_2$ |
|---|---|---|---|---|---|
| | F Per Cent | Cl Per Cent | F Per Cent | Cl Per Cent | |
| 72°–79°/5 mm | 37.09 | 11.75 | 32.15 | 15.0 | 1/1 |
| 85°–91°/5 mm | 47.51 | 10.3 | 45.2 | 10.54 | 2/1 |
| 102°–112°/5 mm | 48.05 | 7.81 | 52.3 | 8.13 | 3/1 |

Example VIII

In a high pressure reaction vessel was placed 182 parts of methyl chloroacetate and 1.5 parts of benzoyl peroxide. The vessel was evacuated and pressured with tetrafluoroethylene to 350 lbs./sq. in. The reaction was run for 8.75 hours at 110° C. A small amount of steam-volatile solid and 6.6 parts of nonsteam-volatile solid (M. P. about 253° C.) were obtained.

| | Cl, Per Cent | Average Ratio $C_2F_4/C_3H_3ClO_2$ |
|---|---|---|
| Analysis of nonsteam-volatile solid | 2.53 | |
| Calculated for $C_{29}H_5ClF_{52}O_2$ | 2.52 | 13/1 |

Example IX

To 1.5 parts of benzoyl peroxide in a cold, evacuated autoclave was added 125 parts of ethane and 50 parts of tetrafluoroethylene. The autoclave was closed and heated to 110° C. for 8 hours. There was obtained 14 parts of colorless solid melting at about 144°–146° C.

| | F Per Cent | C Per Cent | H Per Cent |
|---|---|---|---|
| Analysis of colorless solid | 58.76 | 35.41 | 2.81 |

Example X

One hundred and fifteen parts of freshly distilled cyclohexane and 1 part of benzoyl peroxide were charged into a stainless steel autoclave and after cooling and evacuating, 50 parts of tetrafluoroethylene were added. The autoclave was closed and heated at 110° C. with agitation for about 8 hours. On heating up, the temperature of the reaction mixture was found to increase from 98° C. to 113° C. very quickly, indicating an exothermic reaction. The reaction vessel was cooled to room temperature and the gases bled off. A colorless liquid reaction mixture was obtained and fractionally distilled through an efficient packed column to remove the unreacted cyclohexane and to separate the products into the following fractions:

| Boiling Point | Amount, Parts | Refractive Index $n_D^{25}$ | Analysis | | | Ratio $C_2F_4/C_6H_{12}$ |
|---|---|---|---|---|---|---|
| | | | F Per Cent | C Per Cent | H Per Cent | |
| 141.5°–142° C | 10 | 1.3841 | 39.83 | 53.21 | 6.83 | |
| Calc. for $C_2F_4/C_6H_{12}$ | | | 41.3 | 52.2 | 6.52 | 1/1 |
| 75°–77° C./21 mm | 12 | 1.3626 | 52.60 | 37.00 | 4.69 | |
| Calc. for $(C_2F_4)_2/C_6H_{12}$ | | | 53.5 | 42.2 | 4.22 | 2/1 |
| 98°–106° C./21 mm | 4.5 | 1.3570 | 58.22 | 34.11 | 3.51 | |
| Calc. for $(C_2F_4)_3/C_6H_{12}$ | | | 59.4 | 37.5 | 3.12 | 3/1 |
| 67°–77° C./1.5 mm | 2.5 | Partially solidified at room temperature | | | | |
| Residue solid at room temperature | | | | | | |

Example XI

One hundred and fifty parts of monoamylbenzene, 0.8 part of diethyl peroxide and 2 parts of borax were charged into a silver-lined autoclave and after cooling and evacuating, 50 parts of tetrafluoroethylene were added. The autoclave was closed and heated for 8 hours at 175° C. There was obtained a small amount of liquid steam-volatile product and 5.5 parts of waxy non-steam-volatile solid (M. P. about 280° C.).

Example XII

One hundred and fifty parts of paraffin wax and 1.5 parts of benzoyl peroxide were charged into an autoclave and after evacuating and adding 50 parts of tetrafluoroethylene, the autoclave was closed and heated at 110° C. for 8 hours. One hundred and eighty-one parts of oil and low melting waxy products were recovered. Analysis of the waxy products gave 10.23% fluorine.

Example XIII

Seventy-five parts of dioxane, 75 parts of isooctane and 1.5 parts of benzoyl peroxide were charged into an autoclave and after cooling and evacuating, 50 parts of tetrafluoroethylene were added. The autoclave was closed and heated with agitation at 110° C. for 7.8 hours. The products were separated by steam distillation yielding 21.5 parts of liquid products boiling above 117° C., 2.9 parts of low melting steam-volatile solid and 6.1 parts of waxy nonsteam-volatile solid (M. P. 95° C.).

Example XIV

A mixture of 150 parts of dioxane and 1.5 parts of lauroyl peroxide were reacted with tetrafluoroethylene under 1000 lbs./sq. in. pressure at 110° C. for 8.5 hours. Steam distillation of the resultant reaction mixture yielded 37.5 parts of steam-volatile liquid products and 18 parts of nonsteam-volatile solid products melting at about 250° C. Repeating the experiment under 350 lbs./sq. in. tetrafluoroethylene pressure and adding oxygen equivalent to a partial pressure of ¼ atmosphere instead of lauroyl peroxide, 4.2 parts of steam-volatile liquid products were obtained. The fractional distillation of the combined steam-volatile liquid products from several runs gave the following results.

| Boiling Point, °C. | Refractive Index $N_D^{25}$ | Amount, Parts | Analysis | | | Ratio $C_2F_4/C_4H_8O_2$ |
|---|---|---|---|---|---|---|
| | | | F Per Cent | C Per Cent | H Per Cent | |
| 148.3–152.3 | 1.3700 | 6 | 39.23 | 38.58 | 4.39 | |
| 153–157 | 1.3677 | 7 | | | | |
| Calculated for $C_6H_8F_4O_2$ | | | 40.4 | 38.3 | 4.26 | 1/1 |
| 184–189 | 1.3560 | 6 | | | | |
| 59/5 mm | 1.3562 | 11 | 53.9 | | | |
| Calculated for $C_8H_8F_8O_2$ | | | 52.8 | | | 2/1 |
| 83–90/5 mm | 1.3484 | 11 | | | | 3/1 |

Example XV

One hundred and twenty parts of diethyl ether which had been freshly distilled from sodium and 1.5 parts of benzoyl peroxide were charged into a silver-lined autoclave and the autoclave cooled and evacuated. After pressuring to 350 lbs./sq. in. with tetrafluoroethylene the autoclave was heated to 110° C. for 8.5 hours. Six parts of steam-volatile liquid products were obtained and on fractional distillation the percentage of fluorine was found to increase with increase in boiling point from 1:1 to higher tetrafluoroethylene/diethyl ether reaction products.

| | F Per Cent | C Per Cent | H Per Cent | Ratio $C_2F_4/C_4H_{10}O$ |
|---|---|---|---|---|
| Fraction boiling at 97.5°–104° C | 41.43 | 43.08 | 6.64 | |
| Calculated for $C_6H_{10}F_4O$ | 43.7 | 41.4 | 5.74 | 1/1 |
| Fraction boiling at 158°–158.5° C | 55.60 | 33.04 | 3.70 | |
| Calculated for $C_8H_{10}F_8O$ | 55.45 | 35.0 | 3.64 | 2/1 |

Example XVI

Ninety parts of methylal, 100 parts of tetrafluoroethylene and 1.5 parts of benzoyl peroxide were heated in an autoclave at 110° C. for 8 hours. The reaction mixture was steam distilled and yielded 3.1 parts of steam-volatile liquid products, heavier than water, and 1.1 parts of steam-volatile solid (M. P. about 78° C.) and 17.6 parts of nonsteam-volatile solid (M. P. about 212° C.). A liquid fraction boiling at about 50° C./2 mm. contained 57.6% fluorine.

|  | Analysis F Per Cent | Calculated F Per Cent | Average Ratio $C_2F_4/C_3H_8O_2$ |
|---|---|---|---|
| Nonsteam-volatile solid | 68.18 | 68.5 | 1/1 |
| Liquid fraction B. P. 50° C./2 mm | 57.6 | 60.6 | 3/1 |

Example XVII

One hundred and twenty parts of methanol and 1.5 parts of diethyl peroxide were charged into a stainless steel autoclave. The autoclave was cooled, evacuated and 50 parts of tetrafluoroethylene added. The autoclave was closed and heated at 175° C. for 8 hours. The reaction mixture was steam distilled to yield 6.9 parts of steam-volatile liquid products insoluble in and heavier than water, 2.5 parts of steam-volatile solid (M. P. about 83° C.) and 17.4 parts of non-steam-volatile solid (M. P. about 279° C.). The liquid products were fractionally distilled through an efficient column to give fractions corresponding to the 1:1 ($C_2F_4/CH_3OH$) and other low molecular weight $(C_2F_4)_n/CH_3OH$ reaction products. The liquid products were found to react with sodium giving off hydrogen and to react with acetic anhydride yielding esters. A fraction boiling at 170°–181° C. was found to have the following analysis:

|  | F Per Cent | C Per Cent | H Per Cent |
|---|---|---|---|
| Found | 63.90 | 24.15 | 1.26 |
| Calculated for $H(CF_2CF_2)_2CH_2OH$ | 65.4 | 25.85 | 1.72 |

Esterification of the above product with acetic anhydride gave the corresponding acetate.

|  | F Per Cent | Molecular Weight |
|---|---|---|
| Found | 54.51 | 278 |
| Calculated for $H(CF_2CF_2)_2-CH_2-O\overset{\parallel}{C}-CH_3$ | 55.4 | 274 |

Example XVIII

One hundred and twenty parts of isopropanol, 1.5 parts of benzoyl peroxide and 50 parts of tetrafluoroethylene were heated 9.5 hours at 110° C. under pressure. Steam distillation of the reaction mixture yielded 18 parts of water-insoluble liquid which was heavier than water and 0.5 part of nonsteam-volatile waxy pellets (M. P. about 250° C.). Fractionation of the volatile liquid products yielded a series of liquids which increase in percentage of fluorine with increase in boiling point from the 1:1 product boiling around 120° C. to products boiling above 200° C. at atmospheric pressure which contained 3 tetrafluoroethylene units to one isopropanol unit. These liquid products react with metallic sodium giving off hydrogen and can be esterified by reacting with acetic anhydride to yield esters.

| Boiling Point, °C. | Analysis F Per Cent | Calculated F Per Cent | Ratio $C_2F_4/C_3H_8O$ |
|---|---|---|---|
| 117–119 | 45.0 | 47.5 | 1/1 |
| 147–152 | 54.7 | 58.4 | 2/1 |
| 196–202 | 62.2 | 63.3 | 3/1 |

A similar reaction was obtained using secondary butanol instead of isopropanol.

Example XIX

One hundred and forty parts of ethyl mercaptan, 50 parts of tetrafluoroethylene and 1.5 parts of benzoyl peroxide were heated under pressure for 8 hours at 110° C. The reaction mixture was distilled through an efficient fractionating column to remove the unreacted ethyl mercaptan. About 25 parts of liquid products were obtained and the main fraction, B. P. 86°–88° C., corresponded to the 1:1 ($C_2F_4/C_2H_5SH$) product.

|  | F Per Cent | S Per Cent | C Per Cent | H Per Cent |
|---|---|---|---|---|
| Analysis | 44.89 | 20.68 | 31.11 | 4.15 |
| Calculated for $C_4H_6S$ | 46.9 | 19.75 | 33.8 | 4.23 |

Example XX

One hundred and fifty parts of cyclohexanone and 1.5 parts of benzoyl peroxide were charged into a silver-lined auto clave and after evacuating and pressuring with tetrafluoroethylene to 350 lbs./sq. in., the autoclave was heated to 110° C. for 9.75 hours. Ten parts of steam-volatile, water-insoluble, liquid products heavier than water and a small amount of sticky nonsteam-volatile solid were obtained.

Similar reactions have also been carried out using acetone, methyl ethyl ketone and paraldehyde.

Example XXI

One hundred and fifty parts of propionic acid and 1.5 parts of benzoyl peroxide were charged into a stainless steel autoclave and the autoclave evacuated. Tetrafluoroethylene was added to give 350 lbs.sq. in. pressure and the autoclave was heated for 8 hours at 110° C. The reaction mixture was steam distilled to yield 2.4 parts of greasy, low melting, water-insoluble steam volatile solid and 8 parts of nonsteam-volatile solid (M. P. about 225° C.). The products were soluble in dilute sodium hydroxide and alcohol.

|  | Analysis F Per Cent | Calculated F Per Cent | Average Ratio $C_2F_4/C_3H_6O_2$ |
|---|---|---|---|
| Water-insoluble steam-volatile solid | 56.22 | 55.4 | 2/1 |
| Nonsteam-volatile solid | 66.13 | 66.2 | 5/1 |

Example XXII

Fifty parts of tetrafluoroethylene, 150 parts of acetic anhydride and 1.5 parts of benzoyl peroxide were heated 8 hours at 110° C. under pressure in a silver-lined autoclave. The reaction mixture was steam distilled. There was obtained 0.5 part of steam-volatile water-insoluble liquid, heavier than water and 15.4 parts of nonsteam-volatile solid.

|  | Analysis F Per Cent | Calculated F Per Cent | Average Ratio $C_2F_4/C_4H_6O_3$ |
|---|---|---|---|
| Steam-volatile water-insoluble liquid | 45.02 | 50.3 | 2/1 |

Example XXIII

One hundred and fifty parts of ethyl propionate and 1.5 parts of benzoyl peroxide were reacted with tetrafluoroethylene under 350 lbs./sq. in. pressure for 9 hours at 110° C. There was obtained 5 parts of liquid water-insoluble steam-volatile products and 7 parts of greasy nonsteam-volatile solid.

|  | F Per Cent | C Per Cent | H Per Cent | Average Ratio $C_2F_4/C_5H_{10}O_2$ |
|---|---|---|---|---|
| Analysis of greasy nonsteam-volatile solid | 45.38 | 40.08 | 3.72 |  |
| Calculated for $C_9H_{10}F_8O_2$ | 50.3 | 35.5 | 3.29 | 2/1 |

On repeating the experiment under 1000 lbs./sq. in. tetrafluoroethylene pressure, ten parts of steam-volatile liquid products and 35 parts of granular nonsteam-volatile solid (M. P. about 295° C.) were obtained.

|  | Analysis F Per Cent | Average Ratio $C_2F_4/C_5H_{10}O_2$ |
|---|---|---|
| Nonsteam-volatile solid | 65.03 |  |
| Calculated for $C_{17}H_{10}F_{24}O_2$ | 64.9 | 6/1 |

Example XXIV

One hundred and fifty parts of diethyl malonate and 1.5 parts of benzoyl peroxide were added to a high pressure reaction vessel and after evacuating and pressuring with tetrafluoroethylene to 350 lbs./sq. in. the autoclave was heated to 110° C. for 9 hours. The reaction mixture was steam distilled to yield 2 parts of steam-volatile products and 6 parts of nonsteam-volatile waxy pellets (M. P. about 210° C).

Similar reactions have been obtained using ethyl succinate, di(2-chloroethyl) carbonate, ethylene glycol diacetate and methyl formate.

As hereinbefore stated, this invention comprises heating tetrafluoroethylene at a temperature within the range of from 75° C. to 350° C. in the presence of an oxygen-yielding substance with an organic compound which is free from non-aromatic unsaturation and which contains at least one aliphatic, including cycloaliphatic, carbon atom attached to three atoms other than fluorine.

Said organic compounds are free from ethylenic and acetylenic linkages. Said organic compounds may be acyclic or cyclic, including aliphatic, cycloaliphatic, heterocyclic and alkyl-aromatic organic compounds. Included among examples of organic compounds free from non-aromatic unsaturation containing at least one aliphatic, including cycloaliphatic, carbon atom attached to three atoms other than fluorine, contemplated for use in this invention, are: acids, e. g. acetic acid, propionic acid, isobutyric acid, lauric acid, palmitic acid, stearic acid, benzoic acid, adipic acid, sebacic acid, polyacrylic acid and polymethacrylic acid; their esters with monohydric, polyhydric, and polymeric alcohols, their anhydrides, nitriles, amides and imides; aldehydes and ketones, such as isobutyraldehyde, heptaldehyde, stearaldehyde, acetone, methyl ethyl ketone, acetophenone, cyclohexanone, and their acetals and ketals with monohydric, polyhydric and polymeric alcohols; alcohols, such as methyl alcohol, ethyl alcohol, butyl alcohol, lauryl alcohol, stearyl alcohol, b. zyl alcohol, phenylethyl alcohol, cyclohexyl alcohol; polyhydric alcohols such as ethylene glycol, propylene glycol, glycerol, hexamethylene glycol, decamethylene glycol, mannitol and sorbitol; polymeric alcohols, e. g., polyvinyl alcohol; hydrocarbons, such as methane, ethane, isobutane, isooctane, toluene, cyclohexane, saturated petroleum hydrocarbons, polyethylene, polyisobutylene and polystyrene; ethers, such as dimethyl ether, diethyl ether, dibutyl ether, methyl amyl ether, methyl cyclohexyl ether, anisole, trioxane, dioxane and amines, such as methyl amine, trimethyl amine, butylamine, octyl amine, lauryl amine, stearyl amine, cyclohexyl amine, methyl aniline, toluidine, ethylene diamine, hexamethylene diamine and decamethylene diamine; mercaptans, sulfides and disulfides, such as ethyl mercaptan, butyl mercaptan, octyl mercaptan, dimethyl sulfide, dibutyl sulfide and dimethyl disulfide. The classes of compounds mentioned above may be straight or branched chained or may be cyclic. They may be substituted with such groups as halogen, hydroxyl, carboxyl, cyano, amino, carbonyl, alkoxy and alkyl. These substituents may be the same or different from those already present in the molecule. Examples of compounds of this class include halogen-substituted compounds such as mono-, di- and tri-chloroacetic acids, alpha- and beta-bromopropionic acids, and their esters, mono-, di- and trichloroacetic acid anhydrides, alpha-bromopropionic acid anhydride, trichloroacetaldehyde, beta-chloropropionaldehyde, beta-bromoethyl alcohol, trichloroethyl alcohol, 1-chloro-2,3 dihydroxypropane, 2-chloro-1,3-dihydroxypropane, monochlorodimethyl ether, sym-dichlorodimethyl ether, beta,beta'-dichlorodiethyl ether, acetyl chloride, acetyl bromide, chloroacetyl chloride, propionyl chloride, polyvinyl chloride, polymeric asym. dichloroethylene, carbon tetrachloride, trichlorofluoromethane, chloroform, bromoform, methylene chloride, iodochloromethane, methyl iodide, methyl bromide, methyl chloride, ethyl bromide, 2,2,2-trichloroethane and 2,2-dichloropropane.

While all organic compounds which are free from non-aromatic unsaturation and which contain at least one aliphatic, including cycloaliphatic, carbon atom attached to three atoms other than fluorine, are operative in our novel process, products having most desirable properties are had when the organic compounds reacted with tetrafluoroethylene are halogenated hydrocarbons, preferably polyhalogenated hydrocarbons, which are free from non-aromatic unsaturation and which contain at least one aliphatic, including cycloaliphatic, carbon atom attached to three atoms other than fluorine. Included among examples of said polyhalogenated hydrocarbons are carbon tetrachloride, chloroform, trichlorofluoromethane, iodochloromethane, trichlorotetrafluoropropane and the like.

Although a mixture of organic compounds, as hereinbefore defined, can be reacted with tetrafluoroethylene in accordance with this invention, it is preferable to react a single organic compound therewith. Generally, a relatively large molar excess of the organic compound is used as compared to tetrafluoroethylene in order to prepare low molecular weight products. However, the desired products may often be obtained by using a relatively small amount of said organic compound since the molar ratio of tetrafluoroethylene to organic compound ranges to as high as 25 depending upon the reaction conditions. Usually the molar ratio of said organic compound to tetrafluoroethylene in the reaction mixture may vary from about 0.04:1 to 20:1, but the desired low molecular weight products are obtained in highest yield when said ratio is within the range of from 1:1 to 10:1.

As hereinbefore stated, appreciable effects are had when the reactants are heated at a temperature as low as about 75° C., while a temperature just short of that at which decomposition of the reactants and/or products occurs may be employed. However, maximum yields are obtained with least difficulty at temperatures within the range of from about 100° C. to 250° C.

Oxygen-yielding compounds, i. e. organic and inorganic peroxy compounds, and oxygen are operative in our invention. Included among examples of said catalysts are: diacyl peroxides, such as benzoyl peroxide and lauroyl peroxide; alkyl peroxides, such as diethyl peroxide and tertiary-butyl hydroperoxide; inorganic peroxides, such as sodium peroxide, barium peroxide and hydrogen peroxide; salts of peracids, such as ammonium persulfate, sodium perborate and potassium percarbonate; oxygen; ozone and the like.

The proportion of catalyst may vary within relatively wide limits depending largely upon the nature of the reactants and the products desired. Highly desirable results are obtained with the use of catalysts corresponding to an amount within the range of from 0.001% to 10% by weight of the reactants employed. Advantageous results are sometimes obtained by using a combination of catalysts.

It will be understood that the operating conditions may vary widely depending upon the nature of the reactants and also upon the result desired. However, the reactants should be substantially anhydrous and the reaction should be effected under substantially anhydrous conditions. The time required for carrying out the reaction may vary from a few minutes to several days depending upon the nature of the reactants and the other operating conditions, such as temperature, pressure and catalyst.

The process may be operated continuously or intermittently. The reaction may be carried out in a closed system or the reaction may be carried out in the vapor phase by mixing the vapors of the saturated organic compound and tetrafluoroethylene and passing the mixture of vapors through a hot reaction tube which if desired may contain a catalyst. In general, the reaction may be carried out under atmospheric or superatmospheric pressure in the range of 1 to 1000 atmospheres. The preferred pressure range is 1 to 200 atmospheres.

The reaction may be carried out in any suitable reaction vessel, such as stainless steel, iron, silver, aluminum, and other metals and alloys which are capable of withstanding heat and pressure. The reaction is preferably carried out with agitation, but agitation is not always necessary.

While this invention has been illustrated with particular reference to the use of oxygen-yielding substances as catalysts, it is contemplated that free radical-producing substances, broadly, may be employed as catalysts therein.

The present invention is useful for the production of a wide variety of organic fluorine compounds. Although it is understood that often a mixture of compounds with varying ratios of tetrafluoroethylene units per organic molecule is obtained, the mixture can generally be separated into various definite fractions by various methods, such as steam distillation, fractional distillation, filtration, extraction, fractional crystallization, or by chemical methods. Products with a given ratio of tetrafluoroethylene can often be prepared by the proper choice of conditions and catalyst.

It is believed that the products of this invention have the general formula $X(CF_2CF_2)_nY$, wherein $n$ is a positive integer ranging up to about 25, $X$ is a member of the group consisting of hydrogen and halogen atoms and $Y$ is the complementary portion of the organic reactant, said organic reactant being a compound containing at least one aliphatic, including cycloaliphatic, carbon atom attached to three atoms other than fluorine.

The reaction involved in the preparation of the aforementioned compound may be illustrated by the following specific equations:

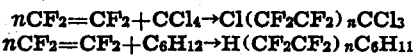

$$nCF_2=CF_2+CCl_4 \rightarrow Cl(CF_2CF_2)_nCCl_3$$
$$nCF_2=CF_2+C_6H_{12} \rightarrow H(CF_2CF_2)_nC_6H_{11}$$

wherein $n$ is a positive integer not greater than 25.

Isomeric products may also be obtained in which all of the tetrafluoroethylene units are not necessarily contiguous. For example, the above products may react with tetrafluoroethylene as illustrated below:

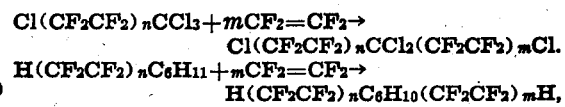

$$Cl(CF_2CF_2)_nCCl_3+mCF_2=CF_2 \rightarrow$$
$$Cl(CF_2CF_2)_nCCl_2(CF_2CF_2)_mCl.$$
$$H(CF_2CF_2)_nC_6H_{11}+mCF_2=CF_2 \rightarrow$$
$$H(CF_2CF_2)_nC_6H_{10}(CF_2CF_2)_mH,$$

wherein $n$ and $m$ are positive integers, the sum of $n+m$ being not greater than 25.

The products had in accordance with this invention ordinarily contain a plurality (not more than 25, and preferably not more than 15) of tetrafluoroethylene units in the molecule thereof. Thus, when a halogenated hydrocarbon, as hereinbefore defined is reacted with tetrafluoroethylene according to our process, each molecule of the resultant product contains a plurality of tetafluoroethylene molecules chemically associated with one molecule of the chlorinated hydrocarbon. On the other hand, when certain organic compounds as hereinbefore defined, e. g. diethyl ether, methanol, isopropanol, ethyl-mercaptan, 2-methyl-2-chloromethyl dioxolane-1,3, and cyclohexane, are reacted with tetrafluoroethylene, a minor proportion of products containing one molecule of the organic compound may be obtained. Said compounds in which said molor ratio is 1:1 may, of course, be separated from the products containing a higher number of tetrafluoroethylene units by conventional processes such as fractional distillation.

The products can be distinguished readily from polymerized tetrafluoroethylene by their analysis, by their physical properties and often by their chemical reactions. The products of this invention vary from liquids to solid products which usually soften or melt below 300° C. when heated in air on a copper block. The liquid products are generally compatible with the common organic solvents and considerable amounts of the solid products are also soluble in organic solvents.

These products differ greatly from tetrafluoroethylene polymers, which are insoluble in organic solvents, inert to chemical attack, do not soften at 300° C., and do not melt at temperatures as high as 550° C. The presence of the organic reactant in the products of this invention can often be shown by the analysis and chemical reactions of the products since many of these organic compounds contain functional groups and elements, such as chlorine, nitrogen and sulfur. Many of the products can be halogenated, e. g. chlorinated by treatment with chlorine under the catalytic influence of light.

The reaction and the separation or isolation of the products may be carried out simultaneously or in separate steps. The products may be separated by filtration, extraction, distillation or crystallization depending upon the nature of the products.

The products of this invention are useful for various commercial purposes. Since many of the products prepared by the processes hereinbefore described are extremely stable, they are generally applicable for use as solvents, reaction media, lubricants and dielectrics. Many of the products have been found to be very desirable in that they are substantially non-flammable, non-corrosive and non-toxic. Substituted fluorocarbons having outstanding thermal and chemical stability can be prepared according to the present invention. This invention is particularly advantageous in that it affords a safe, flexible, practical and economical method of producing highly fluorinated saturated organic products. One of the advantages of the invention is that the process may be operated with a relatively small amount of catalyst and the reaction proceeds smoothly and easily.

Certain specific aspects coming within the broad scope of this invention, namely, the process for obtaining organic fluorine-containing sulfur compounds by heating tetrafluoroethylene in the presence of oxygen, ozone or a peroxy catalyst at a temperature of at least 75° C. and below that at which pyrolysis occurs, with an organic bivalent sulfur compound which is free from non-aromatic unsaturation and contains an aliphatic, including cycloaliphatic, carbon atom attached to three atoms other than fluorine, are the sole invention of and claimed by William E. Hanford, in copending application, Serial No. 567,776, filed of even date herewith, now U. S. Patent No. 2,443,003 dated June 8, 1948, which discloses and claims the process for obtaining organic fluorine-containing sulfur compounds by heating, at a temperature of at least 75° C. and below that at which pyrolysis occurs, a haloethylene having the general formula

wherein the X substituents are halogen atoms having an atomic weight of less than 40 and at least two of said X substituents are fluorine atoms, with an organic bivalent sulfur compound which is free from non-aromatic unsaturation.

Other specific aspects coming within the broad scope of this invention, namely, the process for obtaining organic fluorine-containing alcohols by heating tetrafluoroethylene in the presence of oxygen, ozone or a peroxy catalyst at a temperature of at least 75° C. and below that at which pyrolysis occurs, with an organic alcohol which is free from non-aromatic unsaturation and contains an aliphatic, including cycloaliphatic, carbon atom attached to three atoms other than fluorine, and in which a carbon atom bearing a hydroxyl group has a hydrogen atom directly attached thereto, are the sole invention of and are claimed by Robert M. Joyce, Jr., in copending application Serial No. 567,777 filed of even date herewith, now abandoned, which discloses and claims the process for obtaining organic fluorine-containing alcohols by heating, in the presence of oxygen, ozone or a peroxy catalyst at a temperature of at least 75° C. and below that at which pyrolysis occurs, a haloethylene having the general formula

wherein the X substituents are halogen atoms having an atomic weight of less than 40 and at least two of said X substituents are fluorine atoms, with an alcohol which is free from non-aromatic unsaturation and in which a carbon atom bearing a hydroxyl group has a hydrogen atom directly attached thereto.

This case is a continuation-in-part of our copending application, Serial No. 484,300, filed April 23, 1943, now abandoned.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. The process for obtaining organic fluorine-containing halocarbons, which comprises heating tetrafluoroethylene with carbon tetrachloride at a temperature within the range of from 100° C. to 250° C., the mole ratio of said carbon tetrachloride to said tetrafluoroethylene being within the range of from 1:1 to 10:1, said heating being effected under substantially anhydrous conditions under a pressure within the range of from one atmosphere to 200 atmospheres in the presence of an amount of benzoyl peroxide within the range of from 0.001% to 10% of the combined weight of said tetrafluoroethylene and carbon tetrachloride.

2. The process for obtaining organic fluorine-containing halocarbons which comprises heating tetrafluoroethylene with a chlorinated saturated aliphatic hydrocarbon having chlorine as the sole substituent, the mole ratio of said chlorinated hydrocarbon to said tetrafluoroethylene being within the range of from 1:1 to 10:1, said heating being effected under substantially anhydrous conditions within the range of 100° C. to 250° C. and under a pressure within the range of one atmosphere to two hundred atmospheres in the presence of an amount of peroxy catalyst within the range of from 0.001% to 10% of the combined weight of said tetrafluoroethylene and chlorinated hydrocarbon.

3. The process for obtaining organic fluorine-containing halocarbons, which comprises heating tetrafluoroethylene with a chlorinated hydrocarbon which is aliphatically saturated, has chlorine as the sole substituent and contains at least one carbon atom selected from the class consisting of aliphatic and cycloaliphatic carbon atoms attached to at least one chlorine atom, the mole ratio of said chlorinated hydrocarbon to said tetrafluoroethylene being within the range of from 1:1 to 10:1, said heating being effected under substantially anhydrous conditions within the range of 100° C. to 250° C. and under a pressure within the range of from one atmosphere to 200 atmospheres in the presence of an amount of a peroxy catalyst within the range of from 0.001% to 10% of the combined weight of said tetrafluoroethylene and chlorinated hydrocarbon.

4. The process for obtaining organic fluorine-containing halogenated compounds, which comprises heating tetrafluoroethylene with a halogenated organic compound which is aliphatically saturated and contains at least one carbon atom selected from the class consisting of aliphatic and cycloaliphatic carbon atoms attached to three atoms other than fluorine of which at least one is chlorine, the mole ratio of said halogenated hydrocarbon to said tetrafluoroethylene being within the range of from 1:1 to 10:1, said heating being effected under substantially anhydrous conditions within the range of 100° C. to 250° C. and under a pressure within the range of from one atmosphere to 200 atmospheres in the presence of an amount of a peroxy catalyst within the range of from 0.001% to 10% of the combined weight of said tetrafluoroethylene and halogenated organic compound.

5. A saturated organic fluorine-containing compound containing a plurality of $CF_2CF_2$ units and conforming to the following general formula: $Cl(CF_2CF_2)nCCl_3$ wherein $n$ is a plural integer of not more than 25.

6. A saturated organic fluorine-containing compound containing a plurality of $CF_2CF_2$ units and conforming to the following general formula: $Cl(CF_2CF_2)nY$ wherein Y is the radical of a chlorine-containing saturated aliphatic hydrocarbon compound having chlorine as the sole substituent and $n$ is a plural integer of not more than 25.

7. A saturated organic fluorine-containing compound containing a plurality of $CF_2CF_2$ units and conforming to the following general formula: $Cl(CF_2CF_2)nY$ wherein Y is the radical of a chlorine-containing organic compound which compound is aliphatically saturated and has at least one carbon atom selected from the class consisting of aliphatic and cycloaliphatic carbon atoms attached to three atoms other than fluorine of which at least one is chlorine, and $n$ is a plural integer of not more than 25.

8. The process for obtaining fluorine-containing halocarbons, which comprises heating tetrafluoroethylene with carbon tetrachloride at a temperature within the range of 100° C. to 150° C., said heating being effected under substantially anhydrous conditions under a pressure of at least one atmosphere in the presence of benzoyl peroxide as a promoter.

WILLIAM E. HANFORD.
ROBERT M. JOYCE, Jr.

REFERENCES CITED

The following references are of record in the file of this patent:

UNITED STATES PATENTS

| Number | Name | Date |
|---|---|---|
| 2,230,654 | Plunkett | Feb. 4, 1941 |
| 2,411,159 | Hanford | Nov. 19, 1946 |

OTHER REFERENCES

Mayo, "Jour. Am. Chem. Soc., vol. 65, pages 2324-5 (1943).